US012783459B1

(12) United States Patent
Hsu et al.

(10) Patent No.: US 12,783,459 B1
(45) Date of Patent: Nov. 3, 2026

(54) METHODS AND SYSTEMS FOR VOLTAGE REGISTER CONFIGURATION FILE COMPARISON

(71) Applicant: QUANTA COMPUTER INC., Taoyuan City (TW)

(72) Inventors: Kuo-Chan Hsu, Taoyuan City (TW); Yun-Teng Shih, Taoyuan City (TW); Ming-Chun Li, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 0 days.

(21) Appl. No.: 19/263,123

(22) Filed: Jul. 8, 2025

(51) Int. Cl.
*G06F 16/00* (2019.01)
*G06F 8/71* (2018.01)
*G06F 9/445* (2018.01)
*G06F 16/11* (2019.01)

(52) U.S. Cl.
CPC .............. *G06F 16/116* (2019.01); *G06F 8/71* (2013.01); *G06F 9/44505* (2013.01)

(58) Field of Classification Search
CPC ..................................................... G06F 16/116
USPC .......................................................... 707/756
See application file for complete search history.

(56) References Cited

U.S. PATENT DOCUMENTS 10,867,046 B2 * 12/2020 Lin ........................... H04L 9/30
2021/0334195 A1 * 10/2021 Sethi ................... G06F 11/3688
2025/0217129 A1 7/2025 Huang et al.

FOREIGN PATENT DOCUMENTS

CN 220584649 U 3/2024
TW I874140 B 2/2025

OTHER PUBLICATIONS

TW Office Action and Search Report for Application No. 114138111, mailed Jun. 16, 2026, 5 pp.
English Language Summary for TW Office Action for Application No. 114138111, 1p.

* cited by examiner

*Primary Examiner* — Chelcie L Daye
(74) *Attorney, Agent, or Firm* — Nixon Peabody LLP

(57) ABSTRACT

A computing system for comparing configuration files comprises a vendor controller having a first set of vendor settings. There may be a single or multi-phase controller communicatively coupled with the vendor controller that operates functions of the vendor controller. A memory device with instructions and a processor can execute actions. The actions include defining an initial comparison table with the single or multi-phase controller settings. The computing system can receive a firmware file from a vendor that includes configuration requirements for the first vendor settings. The processor can establish a conversion database based on these first vendor settings and locate the first vendor settings in the firmware file based on this database. The computing system can map the single or multi-phase controller settings to respective settings in the first set of vendor settings. Then, the computing system can generate a revised comparison table that identifies the single or multi-phase controller settings mapped to the respective vendor settings.

18 Claims, 4 Drawing Sheets

METHODS AND SYSTEMS FOR VOLTAGE REGISTER CONFIGURATION FILE COMPARISON

FIELD OF THE INVENTION

The present invention relates generally to methods and systems for comparing voltage register configuration files, and more specifically, to comparing and translating vendor settings for single or multi-phase controllers in computing systems.

BACKGROUND OF THE INVENTION

The single or multi-phase controllers employed in power supplies within computing systems such as computing servers or application specific integrated circuits (ASICs) can be configured to meet design requirements through internal parameter settings. However, different manufacturers have different designs, user interfaces, and numerical conversion methods. Consequently, engineers must invest significant time familiarizing themselves with the operation and specifications of different single or multi-phase controllers and computing system designs.

Firmware files provided by various vendors may also be provided in different file formats. These firmware files do not necessarily contain the same or analogous configuration information. Different numerical expressions may be used for information, and some specifications or parameters may be missing in some file formats. Thus, separate processing may be needed. Likewise, not all computing environments may be capable of processing all the file formats used by various vendors.

For these reasons, for some computing systems, a large amount of time must be spent verifying the configuration requirements of each vendor's parameter settings. This is especially important for computing systems that use backup components from multiple different vendors. Furthermore, verification is required at each project phase and when new firmware is provided by vendors, further increasing the complexity and cost of system setup. Currently, only the manufacturers of controllers can perform parameter comparisons independently, and there are no available cross-vendor comparison tools.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a computing system is provided. The computing system may comprise a vendor controller having a first set of vendor settings. There may be a single or multi-phase controller communicatively coupled with the vendor controller and configured to operate functions of the vendor controller. A memory device with instructions and a processor may then execute actions. The actions can include defining an initial comparison table with the single or multi-phase controller settings. The computing system can then receive a firmware file from a vendor that includes configuration requirements for the first vendor settings. The processor can establish a conversion database based on these first vendor settings, and locate the first vendor settings in the firmware file based on this database. The computing system then can map the single or multi-phase controller settings to respective settings in the first set of vendor settings. Then, the computing system can generate a revised comparison table that identifies the single or multi-phase controller settings mapped to the respective vendor settings.

According to one aspect of the present disclosure, the computing system may further establish a parameter database that includes the first vendor settings and a second set of vendor settings. The first and second vendor settings can be associated with a first and second controller identification of a first and a second single or multi-phase controller.

According to a configuration of the above implementation, the process of locating the first and second vendor settings in the firmware file can include locating the first and second vendor settings in the parameter database.

According to another configuration of the above implementation, the computing system can also identify a presence of a mapping between each of the controller settings and respective settings in the first set of vendor settings. If no mapping is found, the computing system can generate a notification.

In a further aspect of the above implementation, the computing system can verify the correctness of the revised comparison table. If an error is present, the computing system can correct the table based on the error.

In yet a further aspect of the above implementation, correcting the revised comparison table can include receiving a revised firmware file from a vendor.

According to another aspect of the present disclosure, the computing system can translate the firmware file to a machine-readable format. The computing system can then extract the configuration settings from this machine-readable format.

According to a configuration of the above implementation, the computing system can present a graphical representation of the revised comparison table via a user interface.

According to another configuration of the above implementation, the single or multi-phase controller can be operably connected to a direct-current power supply of a computing server system.

According to a further configuration of the above implementation, a computer-implemented method is provided. The method may include defining an initial comparison table containing settings for a single or multi-phase controller. A firmware file including configuration requirements for a first set of vendor settings for a vendor controller can be received. The method may then include establishing a conversion database based on the first vendor settings. Based on the conversion database, locations of the first vendor settings can be found in the firmware file. Then, mappings are made between the single or multi-phase controller settings and respective settings in the first set of vendor settings. The method may then include generating a revised comparison table that identifies the single or multi-phase controller settings and their respective mappings to vendor settings.

In a further aspect of the above implementation, the method may include establishing a parameter database that includes the first set of vendor settings and a second set of vendor settings. The first and second vendor settings can be associated with a first controller identification for a first single or multi-phase controller and a second controller identification for a second single or multi-phase controller.

In yet a further aspect of the above implementation, locating the first and second vendor settings in the firmware file can include locating the first and second vendor settings in the parameter database.

According to another configuration of the above implementation, the method can include identifying the presence of a mapping between each of the single or multi-phase controller settings and respective settings in the first set of vendor settings. If no mapping is found, a notification is generated.

In another aspect of the above implementation, the notification can be sent to a vendor associated with the vendor controller.

According to another configuration of the above implementation, the method can further include verifying the correctness of the revised comparison table. If an error is present, the method includes correcting the revised comparison table based on the error.

In yet another aspect of the above implementation, the corrections may be performed by receiving a revised firmware file from a vendor.

According to yet another configuration of the above implementation, the method may include translating the firmware file to a machine-readable format. The configuration settings can then be extracted from this machine-readable format.

According to certain aspects of the present disclosure, a computing system is provided. The computing system may include a primary controller configured to operate one or more secondary controllers. The primary controller can have primary settings, and the secondary controller can have secondary settings. A memory device with instructions and a processor coupled to the memory can perform actions. These actions may comprise receiving one or more firmware files that contain configuration requirements for the secondary settings. The computing system can establish a conversion database based on the secondary settings. Then, based on the conversion database, the computing system locates the secondary settings in the firmware file. The primary settings can be mapped with respective secondary settings. Then, the computing system can generate a comparison table that identifies the primary settings and their mappings to secondary settings.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
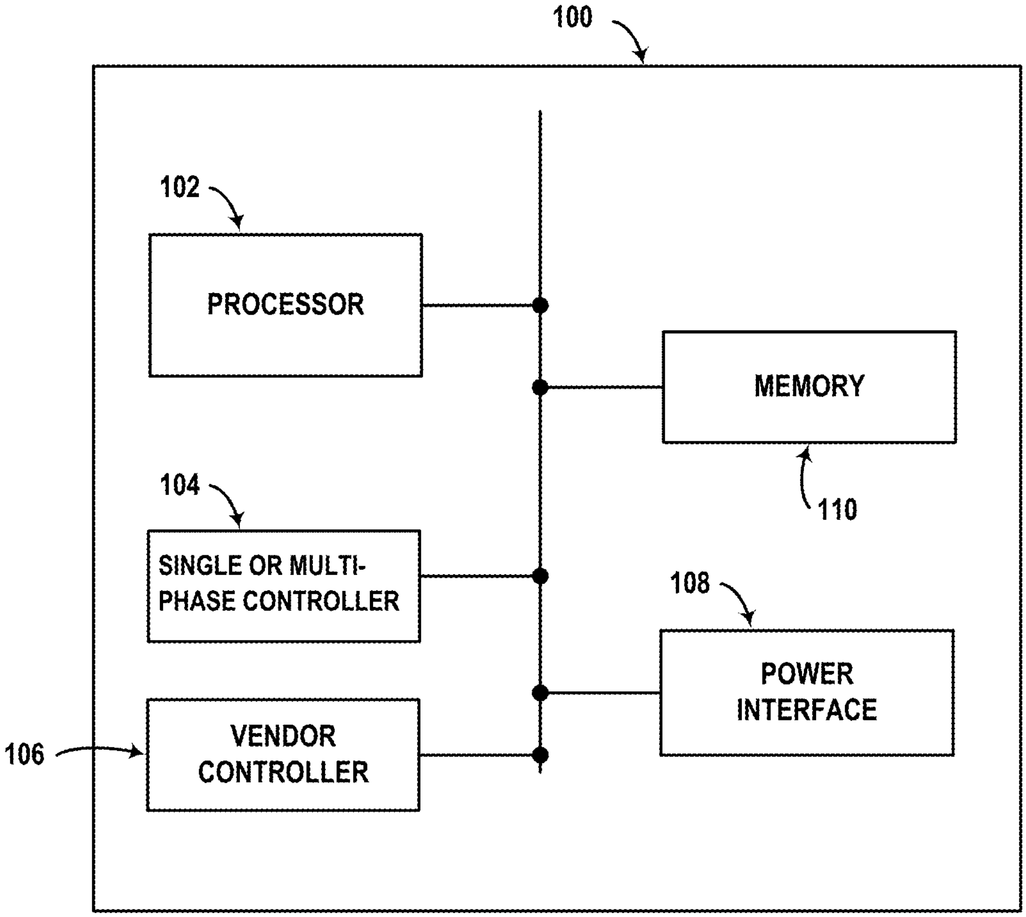
FIG. 1 is a block diagram showing a computing system 100, according to certain aspects of the present disclosure.

A computing system for comparing configuration files is provided. The computing system may comprise a vendor controller having a first set of vendor settings. There may be a single or multi-phase controller communicatively coupled with the vendor controller and configured to operate functions of the vendor controller. A memory device with instructions and a processor may then execute actions. The actions can include defining an initial comparison table with the single or multi-phase controller settings. The computing system can then receive a firmware file from a vendor that includes configuration requirements for the first vendor settings. The processor can establish a conversion database based on these first vendor settings and locate the first vendor settings in the firmware file based on this database. The computing system then can map the single or multi-phase controller settings to respective settings in the first set of vendor settings. Then, the computing system can generate a revised comparison table that identifies the single or multi-phase controller settings mapped to the respective vendor settings.

Various embodiments are described with reference to the attached figures, where like reference numerals are used throughout the figures to designate similar or equivalent elements. Each reference numeral identifies the figure in which the reference numeral first appears based on the first digit (for three-digit reference numerals) or the first two digits (for four-digit reference numerals) corresponding to the figure numeral of the figure. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a block diagram showing a computing system 100, according to certain aspects of the present disclosure, is given. Computing system 100 could be a client device (e.g., a device actively operated by a user), a server device (e.g., a device that provides computational services to client devices), or some other type of computational platform. Some server devices may operate as client devices from time to time to perform particular operations, and some client devices may incorporate server features.

Computing system 100 includes processor 102, single or multi-phase controller 104, vendor controller 106, a power interface 108, and memory 110.

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Single or multi-phase controller 104 may by any sort of power management controller used to operate and control power in a computing system. Single or multi-phase controller 104 may perform power conversion, power control, power management, power delivery, current regulation, voltage regulation, and other power load control functions. Examples of a single or multi-phase controller 104 include analog controllers, digital controllers, digital signal processors, and other integrated circuits (ICs). The single or multi-phase controller may include one or more microcontrollers configured to execute instructions that manage the power in computing system 100.

Vendor controller 106 may be an additional power management controller used to operate and control power in a computing system. The vendor controller 106 may be operated by the single or multi-phase controller 104. The vendor controller 106 may further perform power conversion, power control, power management, power delivery, current regulation, voltage regulation, and other power load control functions. The relationship between the single or multi-phase controller 104 and the vendor controller 106 could be a hierarchical master/slave relationship, with the single or multi-phase controller 104 directly operating the functions of the vendor controller 106. The single or multi-phase controller 104 could also act as a management controller for the computing system 100, coordinating its actions with the vendor controller 106 through shared timing systems or the operations of the processor 102. Examples of a vendor controller 106 include analog controllers, digital controllers, digital signal processors, and other integrated circuits (ICs). The vendor controller 106 may also include one or more microcontroller configured to execute instructions that manage the power in computing system 100.

In some example embodiments, the vendor controller 106 may be a backup component that can perform the functions of the single or multi-phase controller 104. When acting as a backup-component, the vendor controller 106 could be the same type of IC as the single or multi-phase controller 104. The vendor controller 106 could also be provided by a vendor different than the vendor of the single or multi-phase controller 104. In this case, the vendor controller 106 could have a different design, functionality, and internal parameters than the single or multi-phase controller 104. The operation of the single or multi-phase controller 104 and the vendor controller 106 may be controlled by the processor 102. Based on the operations of the computing system 100 and the condition of the single or multi-phase controller 104, the processor 102 may perform operations that activate the vendor controller 106, causing it to manage at least some of the power delivery functions of the single or multi-phase controller 104.

Power interface 108 may be any sort of connection to an external or internal power supply of the computing system 100, such as a direct current (DC) power connection, an alternating current (AC) power connection, a battery, or a capacitor. The power interface 108 may represent a power supply of the computing system 100. For example, the power interface 108 could be a computing server power supply.

Memory 110 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 110 represents both main memory units, as well as long-term storage. Other types of memory may include biological memory.

Memory may store program instructions and/or data on which program instructions may operate. By way of example, memory 110 may store these program instructions on a non-transitory, computer-readable medium, such that the instructions are executable by processor 102 to carry out any of the methods, processes, or operations disclosed in this specification or the accompanying drawings.

Figure 2:
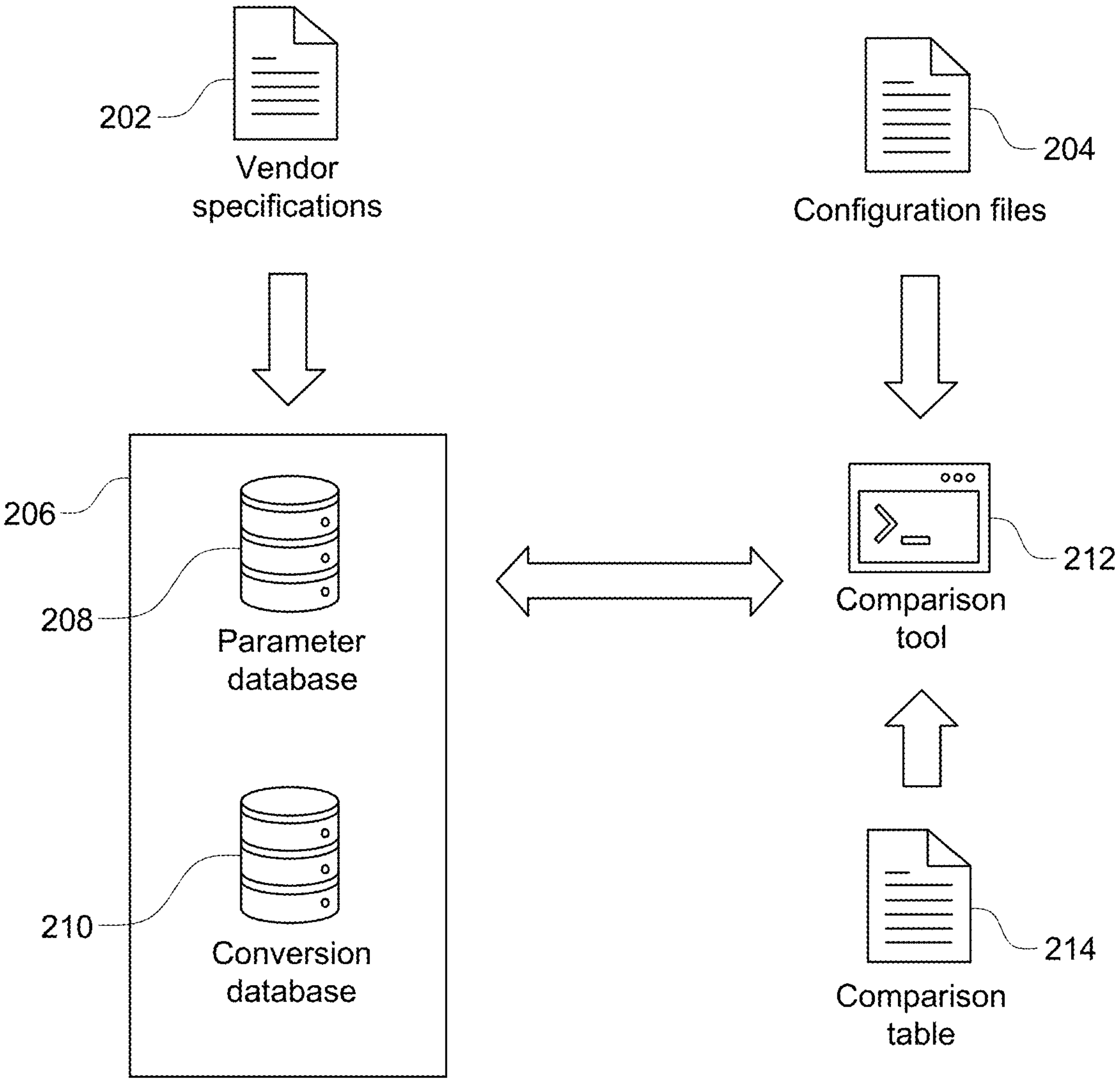
FIG. 2 is a diagram showing a configuration file conversion process, according to certain aspects of the present disclosure.

Referring to FIG. 2, a diagram of a configuration file comparison system, according to certain example embodiments, is shown. The computing system 100 may include vendor specifications 202 associated with the vendor controller 106. The vendor specifications 202 may be a set of specifications for the vendor controller 106 that specifies internal parameters, settings configurations, and other values that are associated with the functions of the vendor controller 106. Examples of such vendor specifications 202 are voltage values to be used at a boot time of the computing system 100, information about various power rails and current values of the power interface 108, and other configuration data.

The vendor specifications 202 may be included in one or more configuration files 204. The configuration files 204 include configuration information for the single or multi-phase controller 104 and the vendor controller 106. These configuration files 204 may be associated with a vendor of the single or multi-phase controller 104 or the vendor controller 106. In some configurations, the configuration files 204 may be, but are not limited to Microsoft® Excel files (.xlsm), text files (.txt), comma separated values (.csv), portable document format (.pdf), or Microsoft® Word document (.docx) files.

The configuration files 204 may be in different formats as described above. This may be based on the vendor or the controllers that the configuration files 204 are associated with. In some cases, the computing system 100 may translate these configuration files 204 into the same machine-readable format. This conversion may be performed by the processor 102. Various file formats and conversion methods can be used. In some configurations, the processor 102 may infer certain settings from the configuration files 204 while translating the files. For example, the configuration files 204 may lack a setting that the single or multi-phase controller 104 or the vendor controller 106 has. In this case, the processor 102 could extrapolate a setting value based on a generic value, the current operations of the computing system 100, or a likely value of the settings, as determined by the processor 102.

The processor 102 may also extract configuration settings from the configuration files 204. The extraction may be done by various means, including text recognition, optical character recognition, and the use of a trained artificial intelligence process. These extracted configuration settings may be associated with the operations of the single or multi-phase controller 104 and the vendor controller 106.

The computing system 100 may also include various databases 206 that include data associated with the functions of the single or multi-phase controller 104 and the vendor controller 106. The databases 206 may include a parameter database 208 and a conversion database 210.

In some configurations of the present disclosure, there may be one or more single or multi-phase controllers 104 and one or more vendor controllers 106. In this case, the different controllers may have different configuration settings based on their functionality and vendor. This may include some controllers having configuration settings that other controllers lack. This may also include the computing system 100 receiving single or multiple sets of vendor specifications 202. When setting up the computing system 100, it may be necessary to convert the configuration settings of one controller to that of another. The parameter database 208 may include data associated with this scenario. The parameter database 208 may include mappings that map the configuration settings of one single or multi-phase controller 104 to another type of single or multi-phase controller 104. Similarly, the parameter database 208 may include mappings that map the vendor specifications 202 of one vendor controller 106 to the vendor specifications 202 of another vendor controller 106.

In some example embodiments, the parameter database 208 may associate a first and a second vendor specification 202 of a first and a second vendor controller 106 with a first and second controller identification of a first and second single or multi-phase controller 104. Multiple vendor specifications 202 can be associated with multiple single or multi-phase controllers 104 in this way. This can indicate which vendor specifications 202 may be associated with which single or multi-phase controller 104 prior to conversion. For example, a first vendor controller 106 may be a backup to a first single or multi-phase controller 104. A second vendor controller 106 may be a backup for a second single or multi-phase controller 104. The first vendor controller 106 would have a first set of vendor specifications 202. The second vendor controller 106 would have a second set of vendor specifications 202. When the vendor specifications are converted into configuration settings for the single or multi-phase controllers 104, the first set of vendor specifications 202 would be converted for the first single or multi-phase controller 104, and the second set of vendor specifications 202 would be converted for the second single or multi-phase controller 104 based on the parameter database 208.

The databases 206 may also include a conversion database 210. The conversion database 210 contains data that can be used by the processor 102 to perform the actual comparisons between the vendor specifications 202 and the configuration files 204. For example, the conversion database 210 may include numerical constants for conversion, rules and algorithms for conversions, controller identifications, and other data used in comparing and converting configuration settings. The conversion database 210 may base these data on at least a portion of the vendor specifications 202 and the configuration files 204. They may also be based on the physical characteristics and the architecture of the single or multi-phase controller 104, the vendor controller 106, and the computing system 100. In some example embodiments, data in the conversion database 210 may be predetermined by a user of the computing system 100.

The comparison and conversion of the configuration settings of the vendor specifications 202 and the configuration files 204 may be performed by a comparison tool 212. The processor 102 may perform operations that implement and execute the comparison tool 212. The comparison tool 212 may base its comparison on the databases 206. The comparison tool 212 may utilize various methods to perform the comparison. For example, the comparison tool 212 may use the processor 102 to calculate numerical conversions from configuration settings in the vendor specifications 202 to configuration settings for the configuration files 204.

In other example embodiments, the comparison tool 212 may generate a comparison table 214 that is associated with a comparison of the vendor specifications 202 and the configuration files 204. The comparison table 214 may contain configuration settings for the single or multi-phase controller 104. The comparison table 214 may also contain configuration settings for the vendor controller 106.

In some example embodiments, the comparison table 214 may contain information about a comparison between settings for the single or multi-phase controller 104 and the vendor controller 106. This comparison may show the differences between the settings of each controller. For example, the comparison table 214 may present the different values and types of settings between the single or multi-phase controller 104 and the vendor controller 106. The comparison table 214 may also indicate the presence of settings that are not common between the single or multi-phase controller 104 and the vendor controller 106. For example, the single or multi-phase controller 104 may have settings registers that are not present in the registers of the vendor controller 106. The comparison tool 212 may detect the presence of this difference, and generate information in the comparison table 214 that is indicative of this difference.

The comparison table 214 may also contain information associated with a comparison of the vendor specifications 202 and the configuration files 204. The information and settings in the vendor specifications 202 and the configuration files 204 may not necessarily be the same the settings of the single or multi-phase controller 104 and the vendor controller 106. In this scenario, the comparison table 214 would contain information associated with differences between the vendor specifications 202 and the configuration files 204.

The comparison tool 212 may be used to generate a revised comparison table 214. By comparing the vendor specifications 202 and the configuration files 204, the comparison tool 212 may modify, delete, perform calculations on, or add configuration settings to the comparison table 214. For example, based on conversion data stored in the conversion database 210, the comparison tool 212 may perform calculations that convert configuration settings in the comparison table 214 to generate a revised comparison table 214.

In other configurations, the revised comparison table 214 may contain mappings between various configuration settings. Based on data contained in the parameter database 208 and the conversion database 210, the comparison tool 212 can map single or multi-phase controller settings in the comparison table 214 to settings of the vendor controller 106. These mappings may be based on data in the vendor specifications 202 and the configuration files 204. In some further configurations, the mappings may identify conversions between single or multi-phase controller 104 and vendor controller 106 settings specified in the conversion database 210.

The comparison tool 212 may present the comparison table 214 to a user of the computing system 100. For example, the comparison tool 212 may generate a formatted data file containing the information about the comparison performed by the comparison tool 212. This formatted data file may be in various file format capable of including and formatting data, such as Microsoft® Excel files (.xlsm), text files (.txt), comma separated values (.csv), portable document format (.pdf), or Microsoft® Word document (.docx) files.

The comparison table 214 can also be used by the processor 102 to generate a graphical representation of the comparison table 214.

Figure 3:
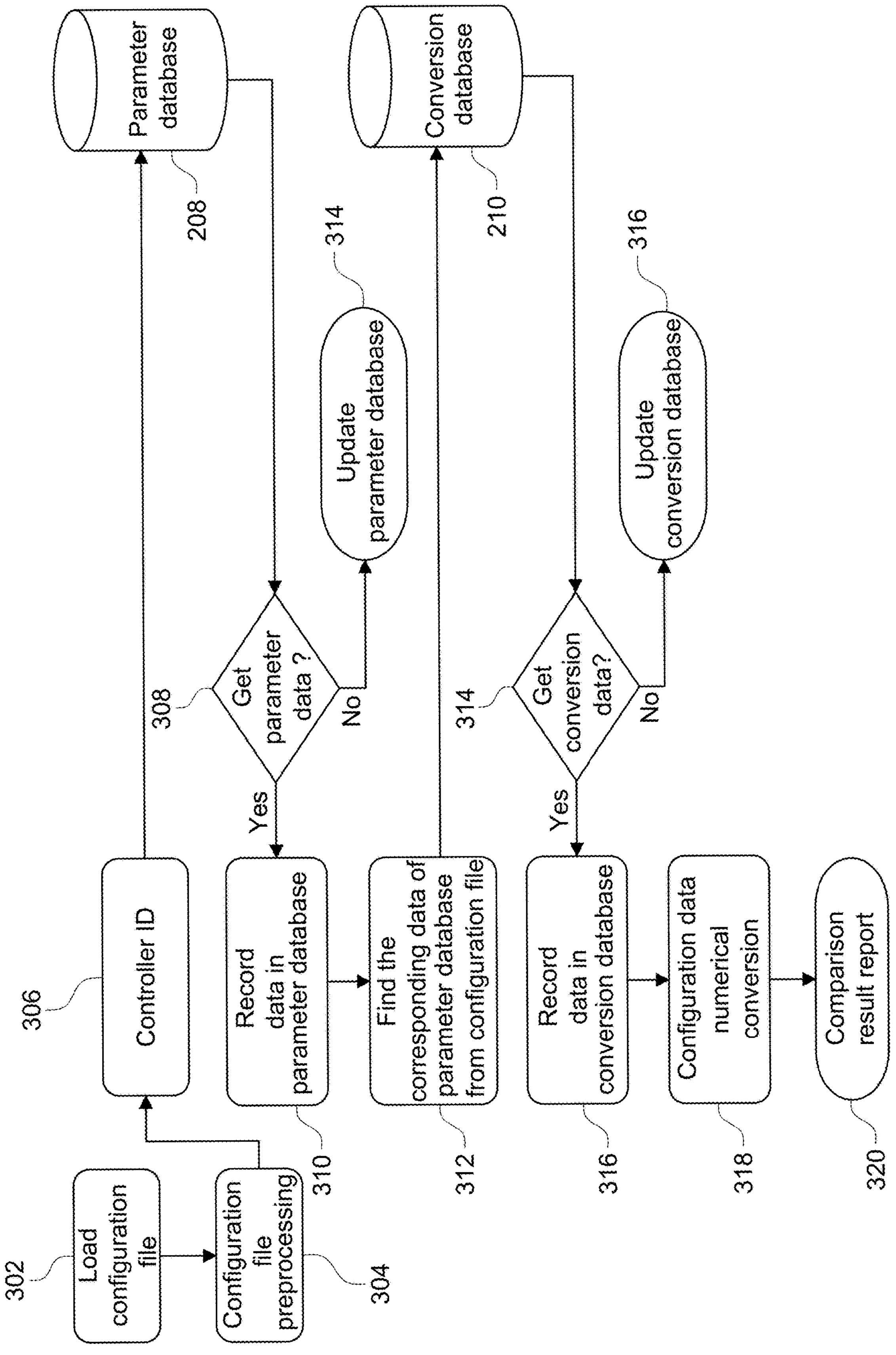
FIG. 3 is a flowchart showing an example program flow for comparison of configuration settings, according to certain aspects of the present disclosure.

Referring to FIG. 3 a flowchart showing an example program flow for comparison configuration settings, according to certain aspects of the present disclosure, is given. FIG. 3 shows how the comparison tool 212 (shown in FIG. 2), may compare configuration settings.

In step 302, the comparison tool 212 loads configuration files 204. As described above, the configuration files 204 may include a range of data about the single or multi-phase controller 104 and the vendor controller 106. Step 304 shows how the configuration files 204 may be preprocessed. The preprocessing in step 304 may include converting the configuration files 204 into different file formats or extracting certain data from the configuration files 204.

One type of information that may be extracted from the configuration files 204 is one or more controller identifications. In step 306, the controller identification can be used to identify a specific single or multi-phase controller 104 or a specific vendor controller 106. The controller identification may also contain information indicative of a vendor of the controllers, or other configuration information. The controller identification can be stored in the parameter database 208. In some cases, the controller identification may be mapped to the configuration settings from the configuration files 204. In some configurations, the controller identification found in step 306 may be stored in the conversion database 210 or a storage or memory of the computing system 100.

The comparison tool 212 can then compare the settings and data extracted from the configuration files 204 to the actual settings of the single or multi-phase controller 104, the actual settings of the vendor controller 106, or other information generated during a startup process of the computing system 100. This comparison may comprise step 308 of determining the presence of an appropriate setting or parameter for a single or multi-phase controller or a vendor controller 106 in the parameter database 208. If a setting exists, step 310 records the parameter, and step 312 finds the appropriate conversion for the setting in the conversion database 210. If no setting exists, then the comparison tool will perform step 314 of determining that it needs to update the parameter database 208.

In step 314, the comparison tool 212 also corrects the parameter database 208. This may include generating a notification indicating that the parameter database 208 is incomplete and that it needs to be updated. The notification may be sent to a user of the computing system 100. In this case, the parameter database 208 may be manually updated. The notification may also be detected by the processor 102, which can search for the missing parameter in the vendor specifications 202, the configuration files 204, or the memory 110 of the computing system 100. In other example embodiments, the notification will be reflected in the comparison table 214. The comparison table 214 may include the notification, or it may include a graphical or numerical indication of the notification.

Referring back to step 312, the comparison tool 212 can find appropriate conversions for identified settings extracted from the configuration files 204. These conversions can be located in the conversion database 210. As stated above, conversions in the conversion database 210 may include numerical rules, statistical methods, predetermined conversions, and other information that can be used by the comparison tool 212 to convert the settings from the configuration files 204.

The conversion database 210 may also contain locations of vendor settings for the vendor controllers 106. Converting the settings extracted from the configuration files 204 may include locating the appropriate vendor settings in the conversion database 210 by the processor 102. When these locations are found, the vendor settings can be used as the conversions. In some example embodiments, the settings of the configuration files 204 may be settings for the single or multi-phase controller 104, and the vendor settings of the conversion database 210 may be settings for the vendor controller 106.

Step 314 checks if the conversion information for a given configuration settings of the configuration files 204 is present in the conversion database 210. If the conversion data is present, the comparison tool 212 will perform step 316 of recording the conversion, step 318 of calculating the conversion by the processor 102, and step 318 of adding the conversion to the conversion database 210.

If no conversion is present, step 320 includes correcting the conversion database 210. This may be done by the processor 102 generating a notification that that conversion database 210 needs to be updated. The notification may be sent to a user of the computing system 100. In this case, the conversion database 210 may be manually updated. The notification may also be detected by the processor 102, which can search for the missing conversion information in the vendor specifications 202, the configuration files 204, or the memory 110 of the computing system 100. In other example embodiments, the notification will be reflected in the comparison table 214 (shown in FIG. 2). The comparison table 214 may include the notification, or it may include a graphical or numerical indication of the notification.

Figure 4:
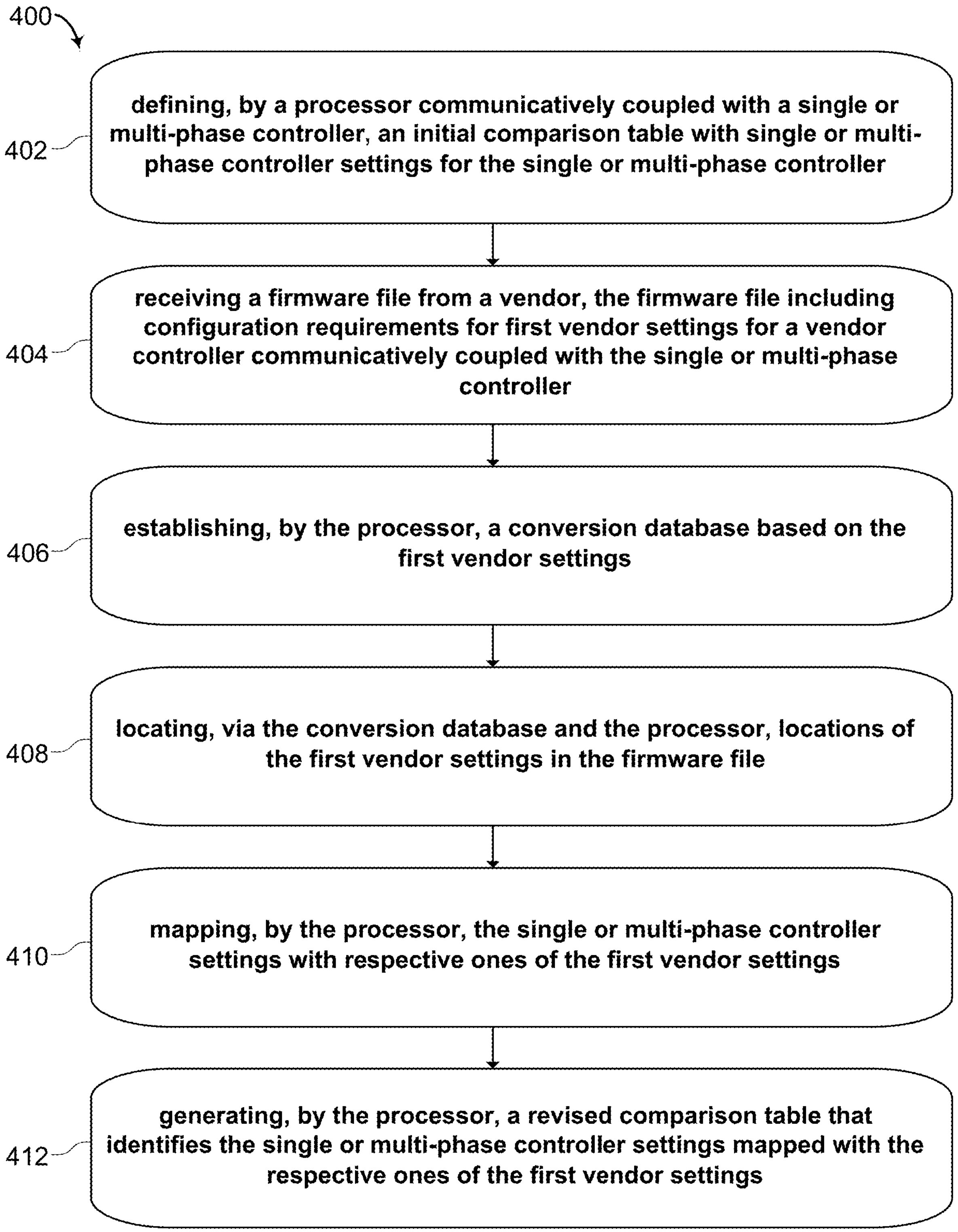
FIG. 4 is a flowchart showing a method for comparison of configuration settings, according to certain aspects of the present disclosure.

Referring to FIG. 4, a flowchart showing a computer-implemented method for the comparison of configuration settings, according to certain aspects of the present disclosure, is given.

Step 402 of method 400 can include defining an initial comparison table 214 by a processor 102 (shown in FIG. 1) communicatively coupled with a single or multi-phase controller 104. The initial comparison table 214 may include single or multi-phase controller 104 settings for the single or multi-phase controller 104. The processor can be the processor 102, the single or multi-phase controller 104, or the vendor controller 106. In some example embodiments, the comparison table 214 may include vendor controller 106 settings for the single or multi-phase controller 104.

Step 404 of method 400 includes receiving a firmware file from a vendor. The firmware file may include configuration requirements for first vendor settings for a vendor controller communicatively coupled with the single or multi-phase controller. The configuration requirements may be the vendor specifications 202 or the configuration files 204. The vendor controller may be the vendor controller 106 shown in FIG. 1.

Step 406 of the method 400 includes establishing, by the processor, a conversion database based on the first vendor settings. The processor of step 406 can be the processor 102, the single or multi-phase controller 104, or the vendor controller 106. The conversion database can be the conversion database 210. The first vendor settings can be the vendor specifications 202. In some example embodiments, the first vendor settings can be based on data associated with a vendor of the processor 102, the single or multi-phase controller 104, or the vendor controller 106. In other example embodiments, the first vendor settings can be based on the configuration files 204.

Step 408 of the method 400 includes locating, via the conversion database and the processor, locations of the first vendor settings in the firmware file. The processor of step 408 can be the processor 102, the single or multi-phase controller 104, or the vendor controller 106. The conversion database can be the conversion database 210. The first vendor settings can be the vendor specifications 202. In some example embodiments, the first vendor settings can be based on data associated with a vendor of the processor 102, the single or multi-phase controller 104, or the vendor controller 106. The locations of the first vendor settings can be locations of the first vendor settings in storage or memory of a computing system, locations in a cloud-based environment, or locations in the firmware file such as the vendor specifications 202 or the configuration files 204. There may also be a first and a second vendor settings in the conversion database 210. In this case, the method 400 may include locating the first and the second vendor settings in the firmware file.

Step 410 of the method 400 includes mapping, by the processor, the single or multi-phase controller settings with respective ones of the first vendor settings. The processor of step 410 can be the processor 102, the single or multi-phase controller 104, or the vendor controller 106. The single or multi-phase controller settings can be associated with the vendor specifications 202 or the configuration files 204. The mappings can be stored in the conversion database 210. These mappings may associate single or multi-phase controller settings and first vendor settings. There may also be a first and a second vendor settings in the conversion database 210. In this case, the method 400 may also include mapping the single or multi-phase controller settings with respective ones of the first and the second vendor settings. In some example embodiments, the method 400 may also include identifying a presence of a mapping between a given single or multi-phase controller setting and a vendor setting.

Step 412 of the method 400 includes generating, by the processor, a revised comparison table that identifies the single or multi-phase controller settings mapped with the respective ones of the first vendor settings. The revised comparison table can be the comparison table 214. These mappings may associate single or multi-phase controller settings and first vendor settings. There may also be a first and a second vendor settings in the conversion database 210. In this case, the method 400 may also include mapping the single or multi-phase controller settings with respective ones of the first and the second vendor settings.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such features may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:

a vendor controller having first vendor settings;

a single or multi-phase controller communicatively coupled with the vendor controller, the single or multi-phase controller being configured to operate functions of the vendor controller via single or multi-phase controller settings;

a memory device having stored thereon machine-readable instructions; and a processor communicatively coupled with the memory device and the single or multi-phase controller, the processor being configured to execute the machine-readable instructions for causing the computing system to:

define an initial comparison table with the single or multi-phase controller settings, receive a firmware file from a vendor, the firmware file including configuration requirements for the first vendor settings, establish a conversion database based on the first vendor settings, locate, via the conversion database, locations of the first vendor settings in the firmware file, map the single or multi-phase controller settings to respective ones of the first vendor settings, and generate a revised comparison table that identifies the single or multi-phase controller settings mapped to the respective ones of the first vendor settings.

2. The computing system of claim 1, wherein the machine-readable instructions further cause the computing system to establish, based on the first vendor settings and second vendor settings, a parameter database including the first vendor settings and the second vendor settings being respectively associated with a first controller identification of the single or multi-phase controller and a second controller identification of a second single or multi-phase controller.

3. The computing system of claim 2, wherein the locating of the locations of the first and the second vendor settings in the firmware file also includes locating the location of the first and the second vendor settings in the parameter database.

4. The computing system of claim 1, wherein the machine-readable instructions further cause the computing system to:

identify a presence of a mapping between each of the single or multi-phase controller settings to respective ones of the first vendor settings; and generate a notification if no presence is found.

5. The computing system of claim 1, wherein the machine-readable instructions further cause the computing system to:

verify a correctness of the revised comparison table to determine a presence of an error in the single or multi-phase controller settings; and correct the revised comparison table based on the error.

6. The computing system of claim 5, wherein the correcting of the revised comparison table includes receiving a revised firmware file from a vendor.

7. The computing system of claim 1, wherein the machine-readable instructions further cause the computing system to:

translate, by the processor, the firmware file to a machine-readable format; and extract, by the processor, the configuration settings from the machine-readable format.

8. The computing system of claim 1, wherein the machine-readable instructions further cause the computing system, via a user interface, to present a graphical representation of the revised comparison table.

9. The computing system of claim 1, wherein the single or multi-phase controller is operably connected to a direct-current power supply of a computing server system.

10. A computer-implemented method comprising:

defining, by a processor communicatively coupled with a single or multi-phase controller, an initial comparison table with single or multi-phase controller settings for the single or multi-phase controller;

receiving a firmware file from a vendor, the firmware file including configuration requirements for first vendor settings for a vendor controller communicatively coupled with the single or multi-phase controller;

establishing, by the processor a conversion database based on the first vendor settings, locating via the conversion database and the processor, locations of the first vendor settings in the firmware file;

mapping, by the processor, the single or multi-phase controller settings with respective ones of the first vendor settings; and generating, by the processor, a revised comparison table that identifies the single or multi-phase controller settings mapped with the respective ones of the first vendor settings.

11. The method of claim 10, further comprising:

establishing, based on the first vendor settings, a parameter database including the first vendor settings and second vendor settings respectively associated with a first controller identification of the single or multi-phase controller and a second controller identification of a second single or multi-phase controller.

12. The method of claim 11, wherein locating the locations of the first and the second vendor settings in the firmware file also includes locating the location of the first and the second vendor settings in the parameter database.

13. The method of claim 10, further comprising:

identifying a presence of a mapping between each of the single or multi-phase controller settings with respective ones of the first vendor settings; and generating a notification if no presence is found.

14. The method of claim 10, further comprising:

verifying a correctness of the revised comparison table to determine a presence of an error in the single or multi-phase controller settings; and if an error is detected, correcting the revised comparison table based on the error.

15. The method of claim 14, wherein the correcting of the revised comparison table includes receiving a revised firmware file.

16. The method of claim 10, further comprising:

translating, by the processor, the firmware file to a machine-readable format; and extracting, by the processor, the configuration settings from the machine readable format.

17. The method of claim 10, further comprising:

presenting, via a user interface, a graphical representation of the revised comparison table.

18. A computing system comprising:

a primary controller configured to operate functions of one or more secondary controllers, the primary controller having primary settings and each of the one or more secondary controllers having respective secondary settings;

a memory device having stored thereon machine-readable instructions; and a processor communicatively coupled with the memory device and the primary controller, the processor being configured to execute the machine-readable instructions for causing the computing system to:

receive one or more firmware files that include configuration requirements for respective ones of the secondary settings, establish a conversion database based on the secondary settings, locate, via the conversion database, locations of the secondary settings in the firmware file, map the primary settings with respective ones of the secondary settings, and generate a comparison table that identifies the primary settings mapped with the respective ones of the secondary settings.

* * * * *